United States Patent
Kim et al.

(10) Patent No.: US 12,214,722 B2
(45) Date of Patent: Feb. 4, 2025

(54) INTERIOR TRIM ARTICLE FOR A MOTOR VEHICLE

(71) Applicant: International Automotive Components Group GmbH, Düsseldorf (DE)

(72) Inventors: Sung-uk Kim, Grafing (DE); Benno Berger, Ebersberg (DE); Florian Ross, Bad Aibling (DE); Carter Cannon, Ebersberg (DE)

(73) Assignee: International Automotive Components Group GmbH, Dusseldorf (DE)

( * ) Notice: Subject to any disclaimer, the term of this patent is extended or adjusted under 35 U.S.C. 154(b) by 0 days.

(21) Appl. No.: 18/247,101

(22) PCT Filed: Sep. 30, 2021

(86) PCT No.: PCT/EP2021/076933
§ 371 (c)(1),
(2) Date: Mar. 29, 2023

(87) PCT Pub. No.: WO2022/069623
PCT Pub. Date: Apr. 7, 2022

(65) Prior Publication Data
US 2023/0373388 A1 Nov. 23, 2023

Related U.S. Application Data

(60) Provisional application No. 63/085,836, filed on Sep. 30, 2020.

(51) Int. Cl.
*B60Q 3/54* (2017.01)
*B60Q 3/64* (2017.01)
(Continued)

(52) U.S. Cl.
CPC ............ *B60Q 3/54* (2017.02); *B60Q 3/64* (2017.02); *B60Q 3/82* (2017.02); *B60R 13/02* (2013.01); *B60R 2013/0287* (2013.01)

(58) Field of Classification Search
CPC .... B60Q 3/54; B60Q 3/64; B60Q 3/82; B60R 2013/0287
See application file for complete search history.

(56) References Cited

U.S. PATENT DOCUMENTS

2014/0203770 A1* 7/2014 Salter .................. H02J 50/80
320/108
2017/0269774 A1 9/2017 Ben Abdelaziz
(Continued)

FOREIGN PATENT DOCUMENTS

DE 102016215763 A1 3/2017
EP 2208645 A1 7/2010
(Continued)

OTHER PUBLICATIONS

International Search Report and Written Opinion of International Application No. PCT/EP2021/076933, mail date Dec. 20, 2021, 15 pages.

*Primary Examiner* — Julie A Bannan
(74) *Attorney, Agent, or Firm* — Grossman, Tucker, Perreault & Pfleger, PLLC; Steven J. Grossman

(57) ABSTRACT

An interior trim article for a motor vehicle, comprises a decorative outer skin; a touch-sensor or proximity sensor; and a backlight lighting source disposed behind said touch sensor or proximity sensor to emit light through the touch-sensor and through the decorative outer skin.

13 Claims, 13 Drawing Sheets

(51) Int. Cl.
*B60Q 3/82* (2017.01)
*B60R 13/02* (2006.01)

(56) References Cited

U.S. PATENT DOCUMENTS

| | | |
|---|---|---|
| 2019/0232887 A1 | 8/2019 | Benchikhi et al. |
| 2021/0300006 A1* | 9/2021 | Piccin .................. B32B 7/12 |
| 2022/0060036 A1* | 2/2022 | Piccin .................. H02J 7/02 |
| 2022/0118831 A1* | 4/2022 | Staser .................. B60J 5/0493 |

FOREIGN PATENT DOCUMENTS

| | | |
|---|---|---|
| EP | 3476658 A1 | 5/2019 |
| WO | 2009089092 A1 | 7/2009 |
| WO | 2019165441 A1 | 8/2019 |

* cited by examiner

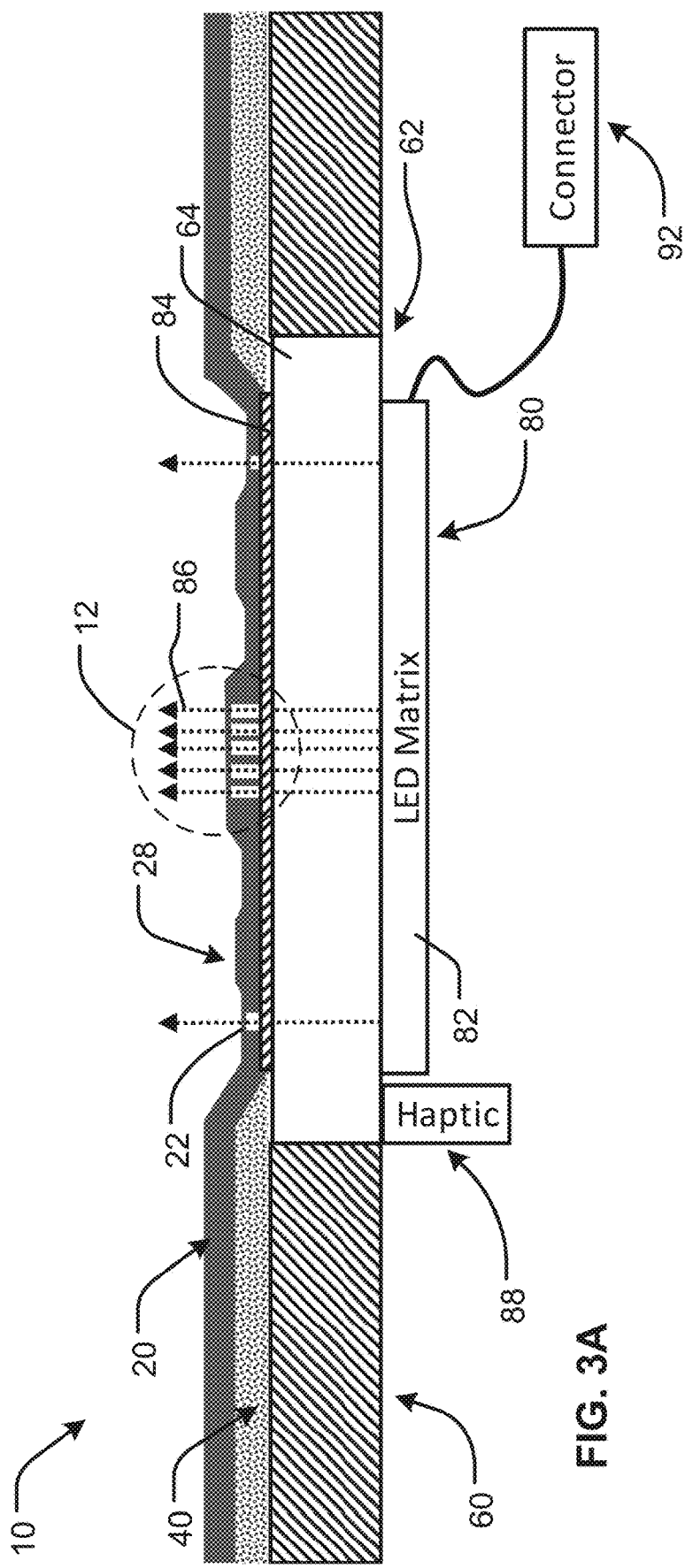
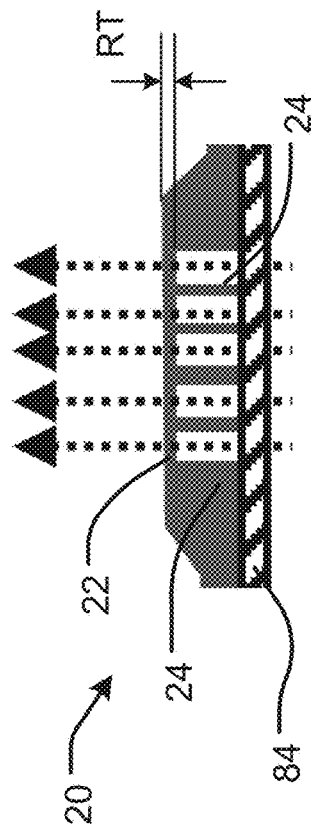
FIG. 3A
FIG. 3B

INTERIOR TRIM ARTICLE FOR A MOTOR VEHICLE

FIELD

The present disclosure relates to an interior trim article for a motor vehicle, particularly with integrated electronic apparatus.

SUMMARY

The present disclosure provides an interior trim article with integrated electronic apparatus, particularly electronic components for an interactive electronic system. The interior trim article makes use of lighting of the electronic apparatus, particularly as backlighting for a touch-sensor or proximity sensor incorporated in the interior trim article.

More particularly, a decorative outer cover of the interior trim article is used in certain regions to transmit and bring backlighting from a rear side of the decorative outer cover to a front side of the decorative outer cover, while other regions of the decorative outer cover may be used as a mask to block light from being emitted from a front side of the decorative outer cover with a defined boundary between the light transmissive and opaque regions.

FIGURES

The above-mentioned and other features of this disclosure, and the manner of attaining them, will become more apparent and better understood by reference to the following description of embodiments described herein taken in conjunction with the accompanying drawings, wherein:

FIG. 3A is a cross-sectional view of the interior trim article of FIG. 1 taken along line 3-3 of FIG. 1;

FIG. 3B is an enlarged cross-sectional view of the decorative outer cover of the interior trim article of FIG. 1 taken within circle 12 of FIG. 3A;

DETAILED DESCRIPTION

Figure 1:
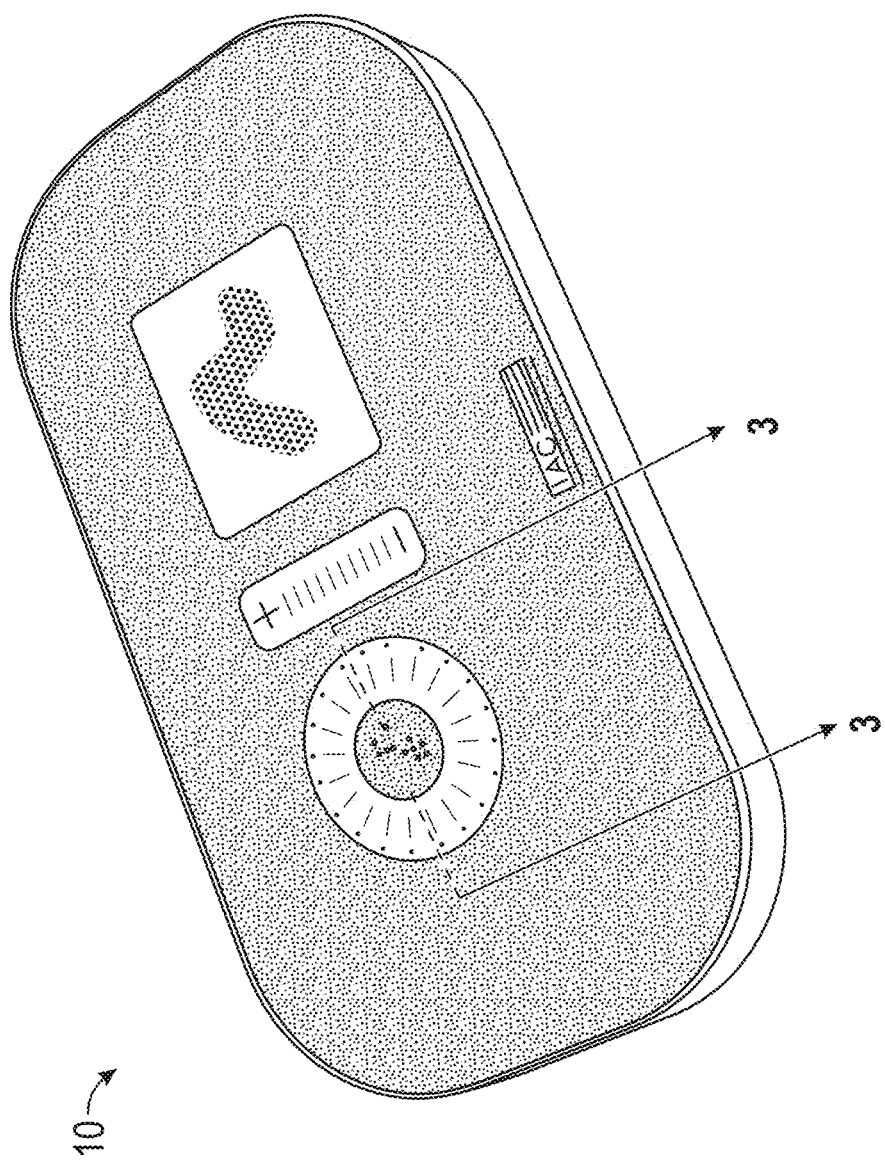
FIG. 1 is a perspective view of an interior trim article for a motor vehicle.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Figure 2:
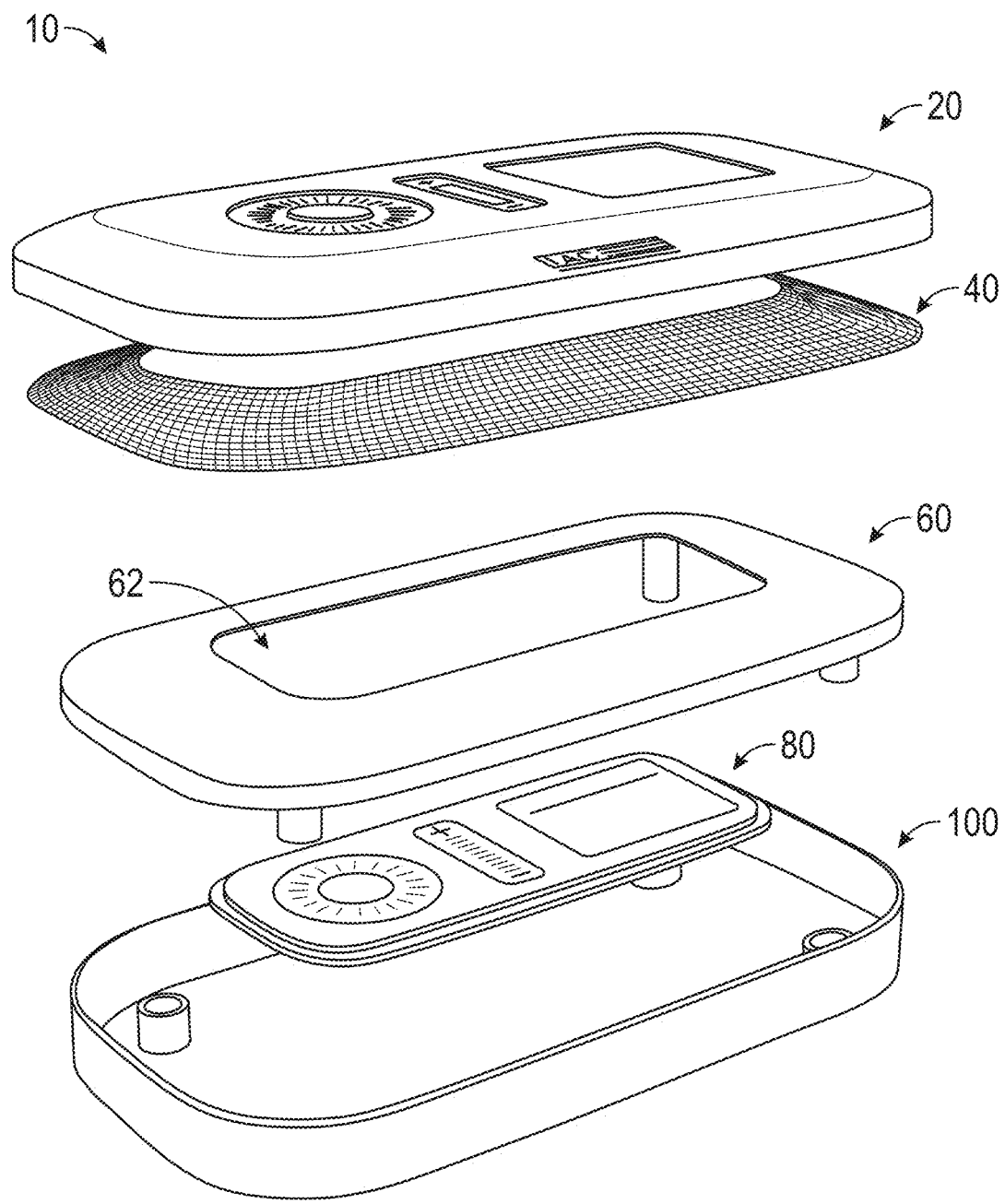
FIG. 2 is an exploded perspective view of the interior trim article of FIG. 1.

Referring now to FIGS. 1-3, there is shown an interior trim article 10 for a motor vehicle. As shown in FIG. 2, interior trim article 10 is formed from a build-up of assembled components. In particular, FIG. 2 shows that interior trim article 10 preferably comprises a molded decorative outer cover 20 (also known as a decorative outer skin), a backing/cushion 40 (also known as a soft touch layer) and a substrate 60 (also known as a carrier), which supports the decorative outer cover 20 and the backing/cushion 40 as well as the interior trim article 10 and provides for attachment to the motor vehicle. Decorative outer cover 20 may be formed from a flexible polymer composition, particularly by slush molding, rotational molding, injection molding or casting, as well as extrusion as a planar thermoformable sheet. Decorative outer cover 20 may preferably have a thickness in a range of 0.5 mm to 1.5 mm. The polymer composition for the decorative outer cover 20 may comprise, essentially consist of or consist of at least one thermoplastic synthetic polymer such as plasticized polyvinyl chloride (PVC), thermoplastic urethane (TPU), thermoplastic olefin (TPO), thermoplastic elastomers (TPE), polyvinyl chlorideacrylonitrile-butadiene-styrene (PVC-ABS), acrylonitrile-styrene-acrylic (ASA), blended elastomeric thermoplastic polymers and thermoplastic polyolefins (ETP-TPO). Decorative outer cover 20 may also be formed of natural (real) or artificial (synthetic) leather. The surface of the outer side of the decorative outer cover 20 may also include printing (e.g. silk screen), a grain/texture and/or be laser etched.

Backing/cushion 40 may be provided by a resilient, compressible foam formed from a polymer composition. The polymer composition may comprise, essentially consist of or consist of at least one synthetic polymer such as polyurethane (PU) and polyolefin (PO), such as, for example, polypropylene (PP).

Backing/cushion 40 may also be provided by a sandwich structure formed of at least one layer of woven textile fabric sandwiched between two opposing layers of scrim fabric. A scrim fabric (e.g. open net, mesh, gauze) may be understood as a woven, nonwoven, or knitted fabric which is specifically described as having an open or loose configuration of strands.

Backing/cushion layer 40 may also comprise a spacer fabric, such as a warp knitted textile spacer fabric as disclosed in U.S. Pat. No. 5,385,036 to Spillane entitled "Warp Knitted Textile Spacer Fabric, Method of Producing Same, and Products Produced Therefrom", hereby incorporated by reference in its entirety. Backing/cushion layer 40 may also comprise a combination of a woven fabric and a knitted fabric. The backing/cushion layer 30 may preferably have a thickness in a range of 1 mm to 6 mm, and more particularly have a thickness in a range of 1.5 mm to 2.5 mm.

Substrate 60 may be formed of a relatively rigid polymer composition, particularly by injection molding. Substrate 60 may preferably have a thickness in a range of 1 mm to 3.5 mm, and more particularly in a range of 1.5 mm to 2.5 mm.

Substrate 60 may comprise a polymer composition preferably having a flexural modulus as measured in accordance with ASTM D-790-10 of at least 150,000 psi. at room temperature (23° C.) in order for substrate to provide sufficient rigidity to support first interior trim article 10. More particularly, the first article substrate 60 may have a flexural modulus as measured in accordance with ASTM D-790-10 in a range of 250,000-600,000 psi. at 23° C.

In addition to providing sufficient rigidity for substrate 60 of interior trim article 10, the polymer composition for substrate 60 should also preferably provide suitable heat resistance. As such, the substrate 60 may be formed of a polymer composition preferably having a heat distortion temperature as measured in accordance with ASTM D-648-07 of at least 82° C. at 264 psi. More particularly, substrate 60 may have a heat distortion temperature as measured in accordance with ASTM D-648-07 in a range of 82-110° C. at 264 psi.

The polymer composition for the substrate 60 may comprise, essentially consist of or consist of at least one thermoplastic synthetic polymer such as polypropylene (PP), acrylonitrile-butadiene-styrene (ABS), polycarbonate (PC), polycarbonate/acrylonitrile-butadiene-styrene (PC/ABS) or polyphenylene oxide (PPO).

As shown in FIG. 2, interior trim article 10 further comprises an electronic apparatus 80 and rear closure/housing 100, which covers the electronic apparatus 80 and is removably fastenable to substrate 60 with fasteners, such as fasteners (e.g. threaded fasteners such as screws), heat-staking, ultrasonic welding or adhesives.

Referring to FIG. 3A-3B, as shown, the substrate 60 preferably includes a region or window 62, which is occupied by a (visible) light transmissive member 64, which may include one or more graphics. Light transmissive member 64 may be transparent or translucent. Exemplary materials for light transmissive member 64 include polycarbonate (PC), polymethyl methacrylate (PMMA) and tempered glass. Similar to a remainder of substrate 60, light transmissive member 64 may have a thickness in a range of in a range of 1 mm to 3.5 mm, and more particularly in a range of 1.5 mm to 2.5 mm.

As shown by FIG. 3A-3B, electronic apparatus 80 has a backlighting (visible light) light source 82 (e.g. LED including an independent LED, RGB LED matrix, LED display, OLED, Micro LED, LED on a PCB or LCD), which underlies light transmissive member 64, and a touch-sensor foil 84 which overlies underlies light transmissive member 64. Touch-sensor foil is preferably bonded (laminated) to the light transmissive member 64, particularly with an optically clear adhesive (OCA) or optically clear resin (OCR). Touch-sensor foil 84 may be a capacitive or resistive touch touch-sensor foil as known in the art. More particularly, the touch-sensor foil 84 may comprise a transparent touch foil as known in the art for displaying images. The touch-sensor foil 84 allows for touch control, switch input, drawing input and gesture input as part of the interactive electronic system, which is programmable and reconfigurable.

Alternatively, in lieu of the touch sensor foil 84, one may utilize any component that is responsive to touch and/or even the proximity of a user's hand/fingers, etc., that then provides a sensor input. Accordingly, this may include, but is not limited to, e.g., one or more a proximity sensors or even one or more cameras. The proximity sensor may therefore include a sensor that itself may emit an electromagnetic field which then identifies changes in the field by way of a return signal. Accordingly, while preferred, one does not need to utilize a touch-sensor foil, and may employ other electronic circuitry to capture an input, which may therefore be touch-based or touchless (no physical contact). While the invention therefore is now further described herein with the preferred touch-sensor foil 84, the aforementioned embodiments are included in the broader context of this invention.

In addition, it is contemplated herein that one may avoid the need for the presence of the substrate with light transmissive member 64. In such configuration, one would therefore have the presence of the decorative skin, one or more recesses 24 in said skin, a touch sensor and/or proximity sensor, and a light source. In addition, it is contemplated herein that one not utilize the recesses 24 and provide a decorative outer cover cross-section that still allows for transmission of visible light.

As best shown by FIG. 3B, images displayed on the preferred touch-sensor foil 84 which are backlit by visible light 86 from backlighting light source 82 are visible though the decorative outer cover 20 in reduced thickness regions 22 of the decorative outer cover having a reduced thickness RT in a range of 0.1 mm to 0.3 mm. As shown, the reduced thickness regions 22 are adjacent the distal end of blind recesses 24 while adjacent regions 24 of full thickness of the decorative outer cover 20, which are opaque to light transmission due to their increased thickness, mask the visible light 86 from the backlighting light source 82.

In addition to the foregoing, decorative outer cover 20 may include one or more tactile switch indicators 28 on the surface to operate functions of the electronic apparatus 80 and/or the motor vehicle. For example, the switch indicators 28 may be seat switch indicators, HVAC switch indicators, window switch indicators, door lock switch indicators, headlight switch indicators, radio switch indicators, etc.

Electronic apparatus 80 also includes a haptic actuator 88, which may provide a haptic (tactile) feedback (e.g. vibration) to a user of the electronic apparatus 80 in response to touching of the touch-sensor foil 84. Such may also be actuated in response to a user touching one or more of the switch indicators 28 to provide the user with tactile feedback that the function associated with the switch indicators 28 has been actuated.

Figure 4A:
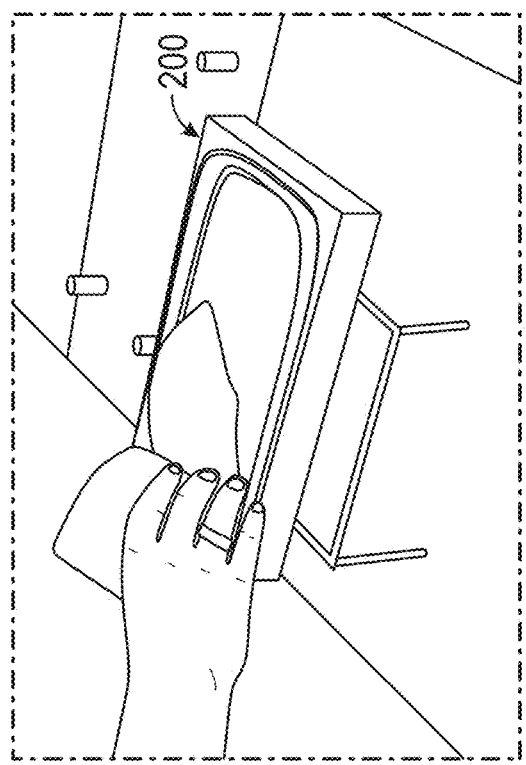
FIGS. 4A-4L show a process for making a decorative outer cover for the interior trim article of FIG. 1 and such incorporated in the interior trim article.
Figure 4B:
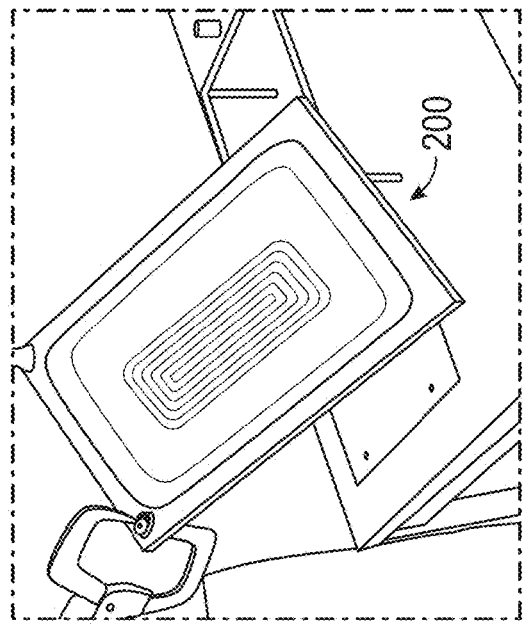
Figure 4C:
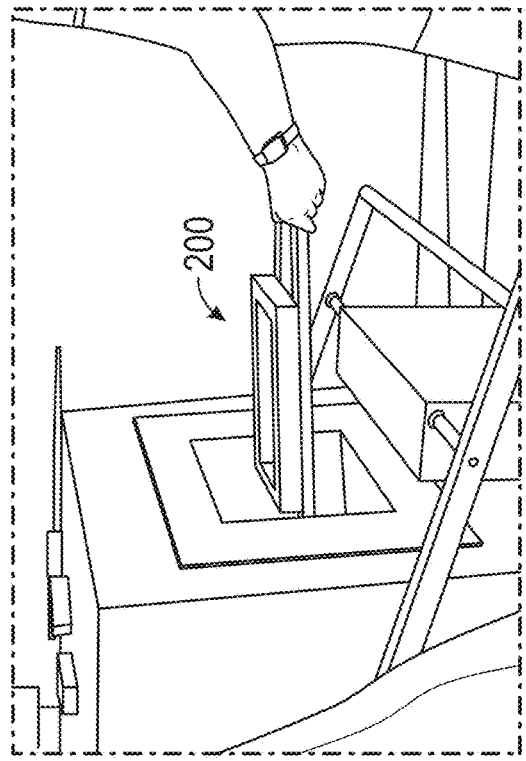
Figure 4D:
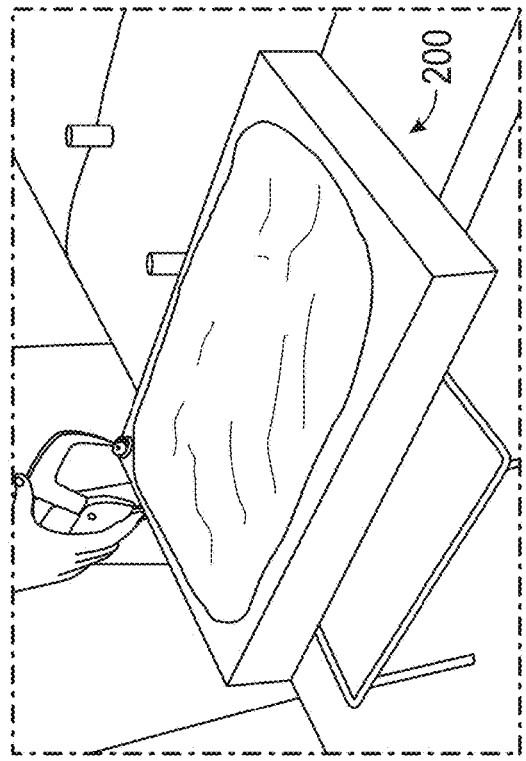
Figure 4F:
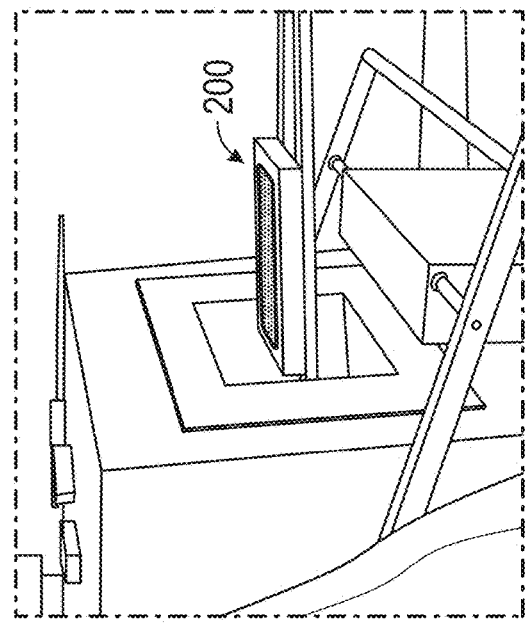
Figure 4H:
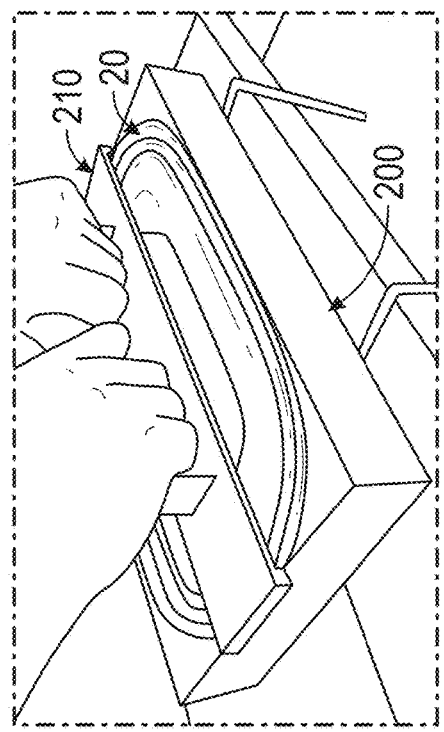
Figure 4E:
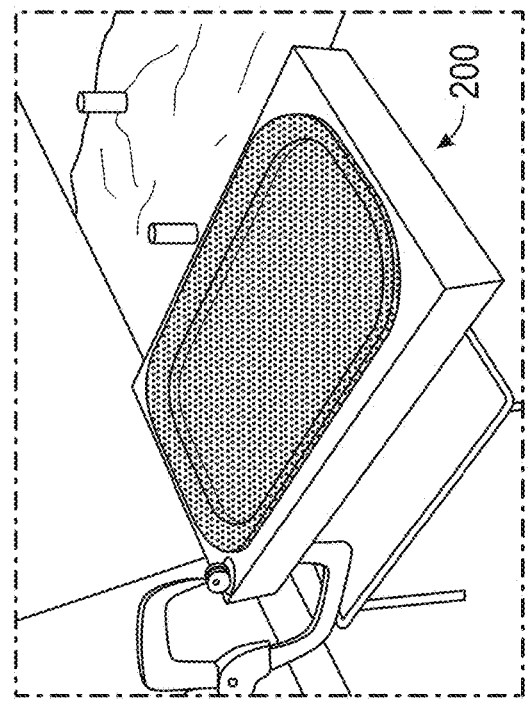
Figure 4G:
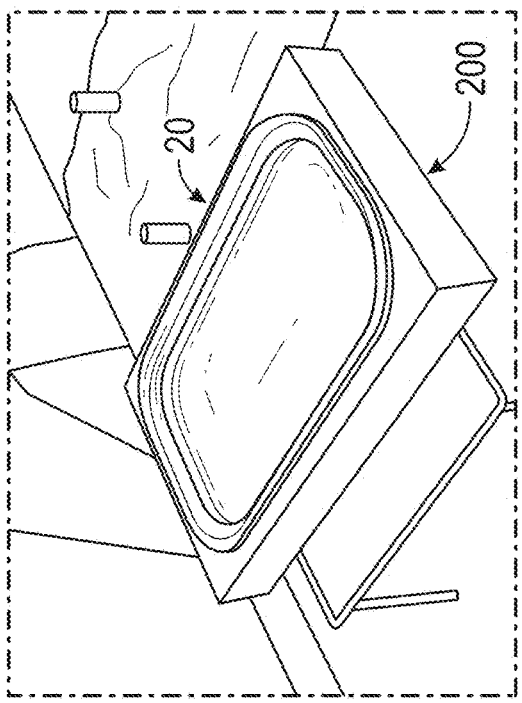
Figure 4J:
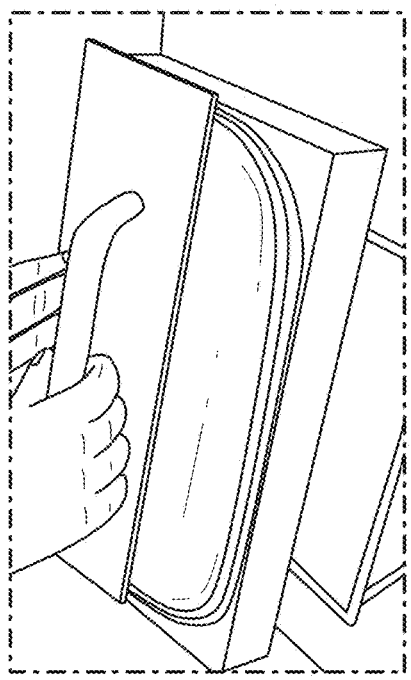
Figure 4L:
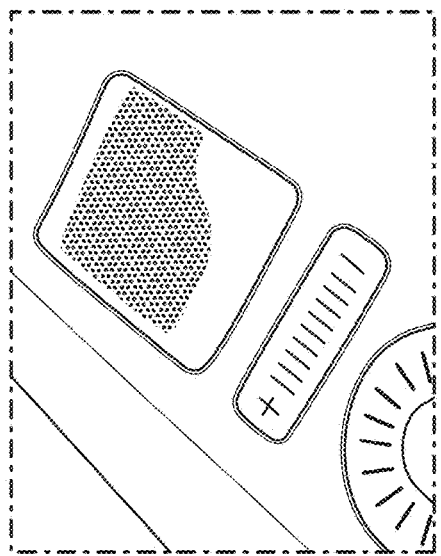
Figure 4I:
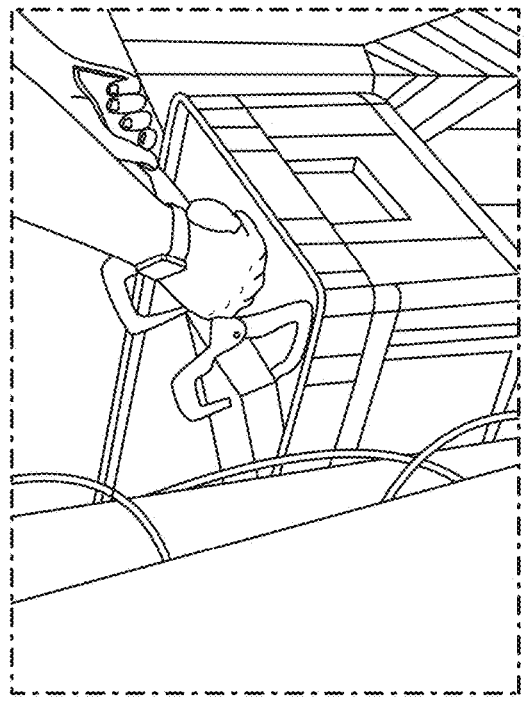
Figure 4K:
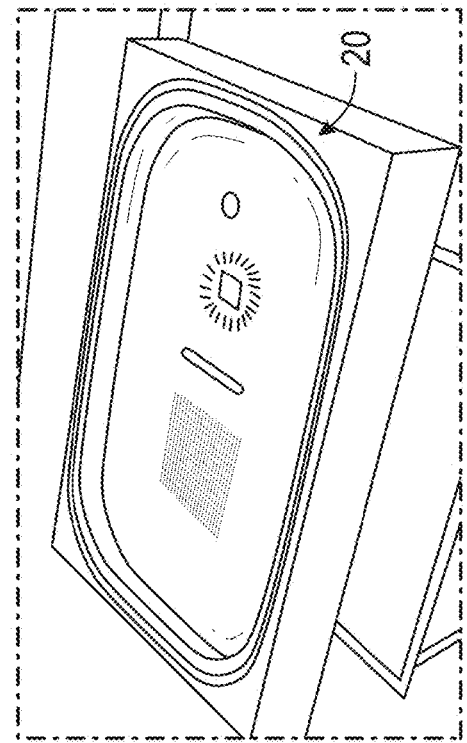

Electronic apparatus 80 also includes a power and or data transmission connector 92 to power electronic apparatus 80 and/or provide data to the touch-sensor foil 84. FIGS. 4A-4L show a process to make the decorative outer cover 20 according to the present disclosure. In FIG. 4A, a mold 200 for the decorative outer cover 20 is heated in an oven (e.g. temperature of 240-260° C. for PVC). In FIG. 4B, the polymer composition in powder particle form is applied to the mold 200, at which time the powder particles partially melt and fuse. As shown, in FIG. 4B, the polymer composition in powder particle form is applied to the mold 200 by being poured onto the mold 200 in an amount in excess of what is required to form the decorative outer cover 20. In FIG. 4C, the mold 200 with the applied powder particles is vibrated to compact the powder particles. In FIGS. 4D-4E, excess powder particles which has not undergone any melting or fusion with other powder particles is removed from the mold 200. In FIG. 4F, the mold 200 with a semi-fused coating of the power particles is placed in the oven for a second time and heated for a second time to fully melt and fuse the power particles. In FIG. 4G, the mold 200, with the heated, melted and fused power particles which have now formed the decorative outer cover 20 is removed from the over. In FIG. 4H, a stamping die 210 with protrusions 220 (see FIG. 5) which form the recesses 24 in the decorative outer cover 20 is pressed into the decorative outer cover to form the blind recesses or perforations 24. In FIG. 4I, the mold 210 with the stamping die 210 is cooled. In FIG. 4J, the stamping die 210 is removed from the mold 210 and the decorative outer cover 20. In FIG. 4K, the decorative outer cover 20 is ready for removal from the mold 200. In FIG. 4L, the decorative outer cover 20 is installed in the interior trim article 10.

In an alternative process, the powder particles of the polymer composition may be applied to the mold 200 using a spray device, such as a spray gun. With this process, excess powder does not need to be removed from mold 200, and thus the step shown in FIG. 4D may be eliminated.

Figure 5:
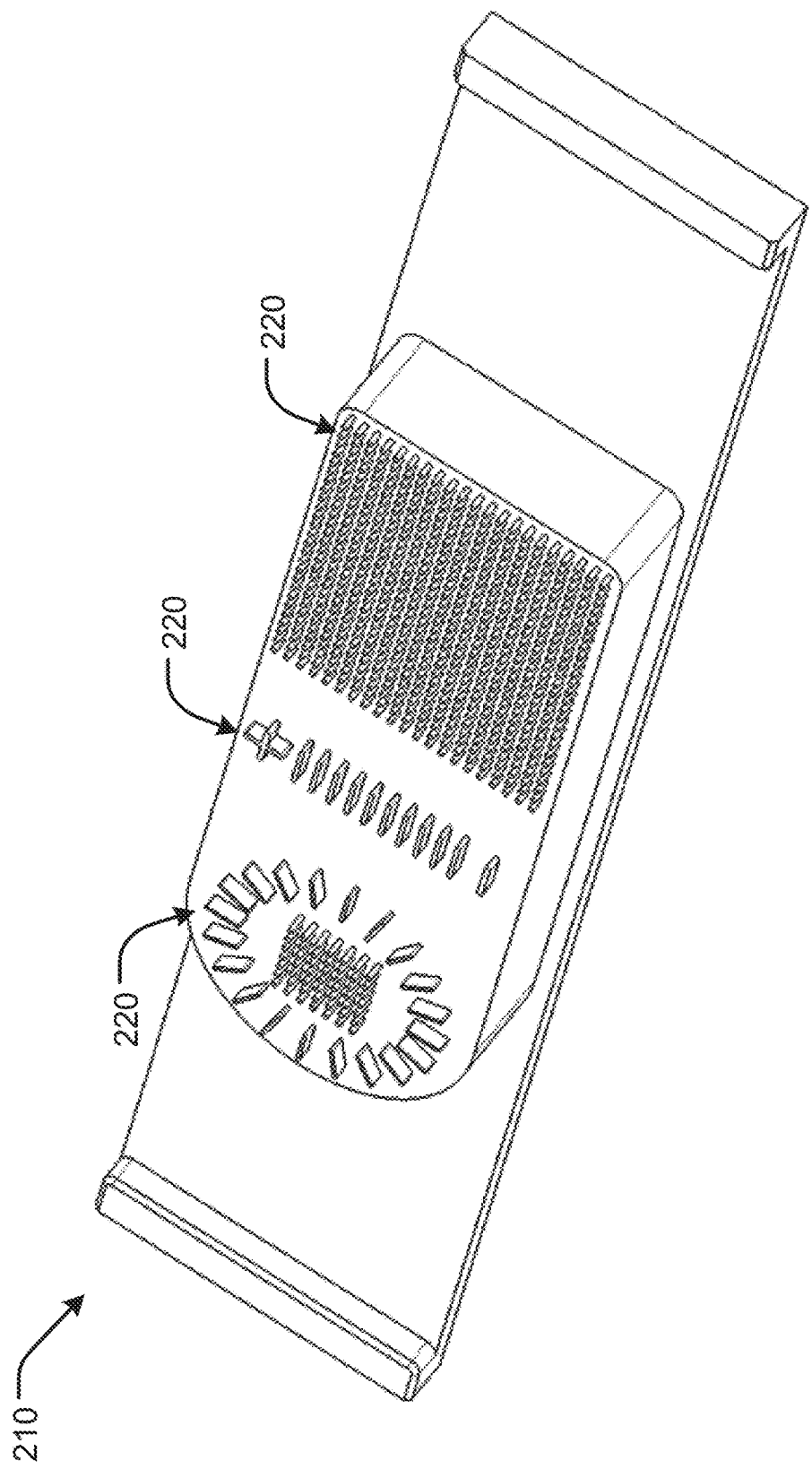
FIG. 5 shows a front side of a stamping die used to press/stamp into a rear side of the decorative outer cover in FIG. 4H.

FIG. 5 shows a front side of the stamping die 210 used to pressed into a rear side of the decorative outer cover 20 in FIG. 4H to form the blind recesses 24.

Figure 6A:
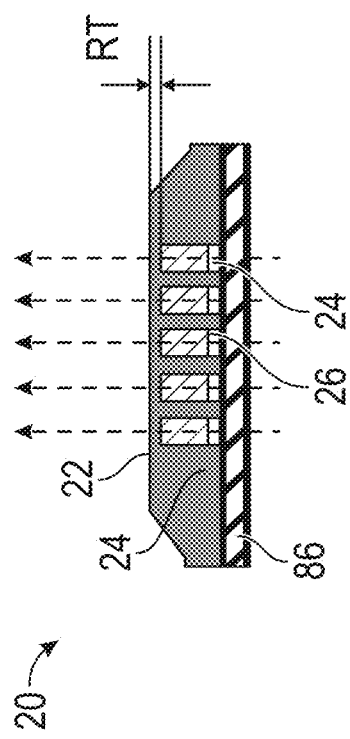
FIG. 6A shows an enlarged cross-sectional view of another embodiment of the decorative outer cover of the interior trim article of FIG. 1 taken within circle 12 of FIG. 3A.
Figure 6B:
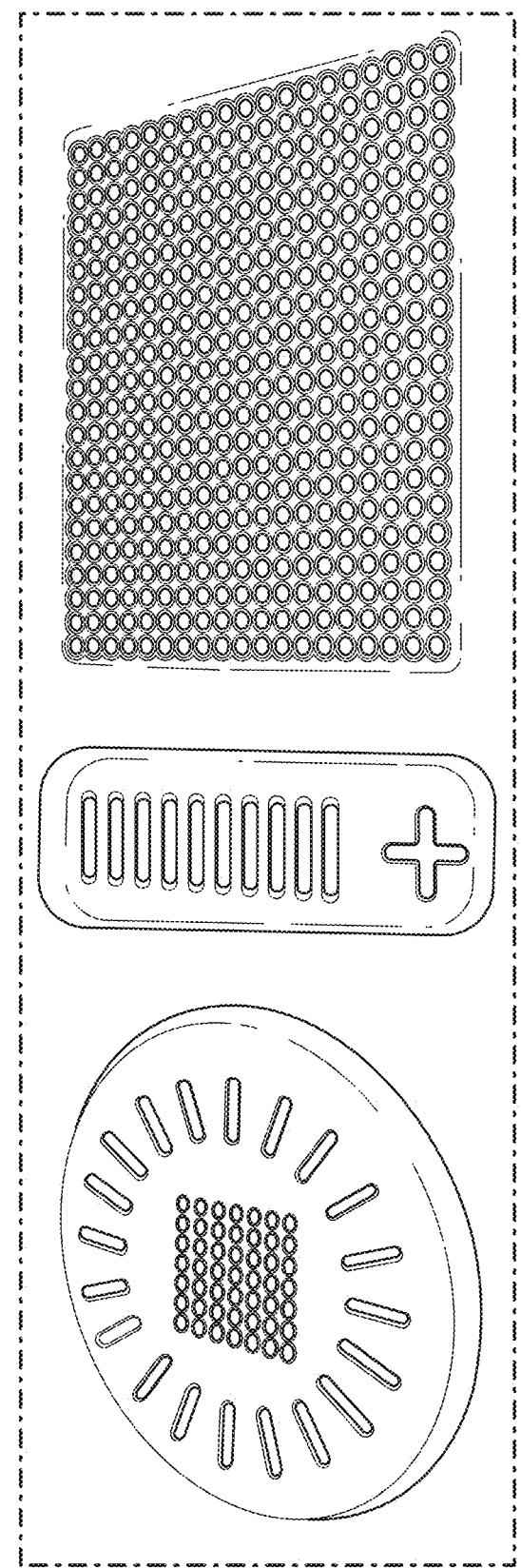
FIGS. 6B-6E show close-up views for each of the features formed in the decorative outer cover, with recesses at least partially filed with the transparent or translucent material as shown in FIG. 6A.
Figure 6C:
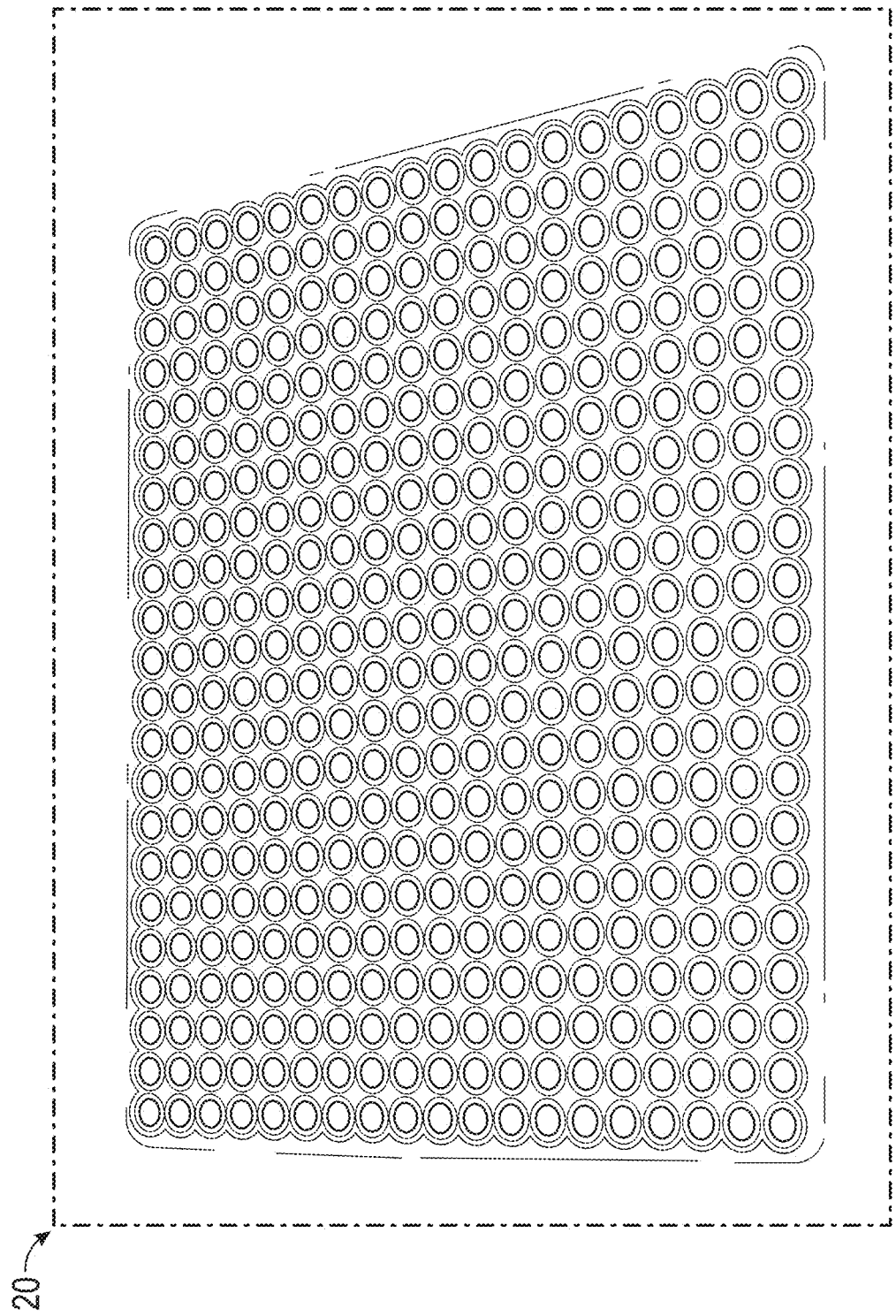
Figure 6D:
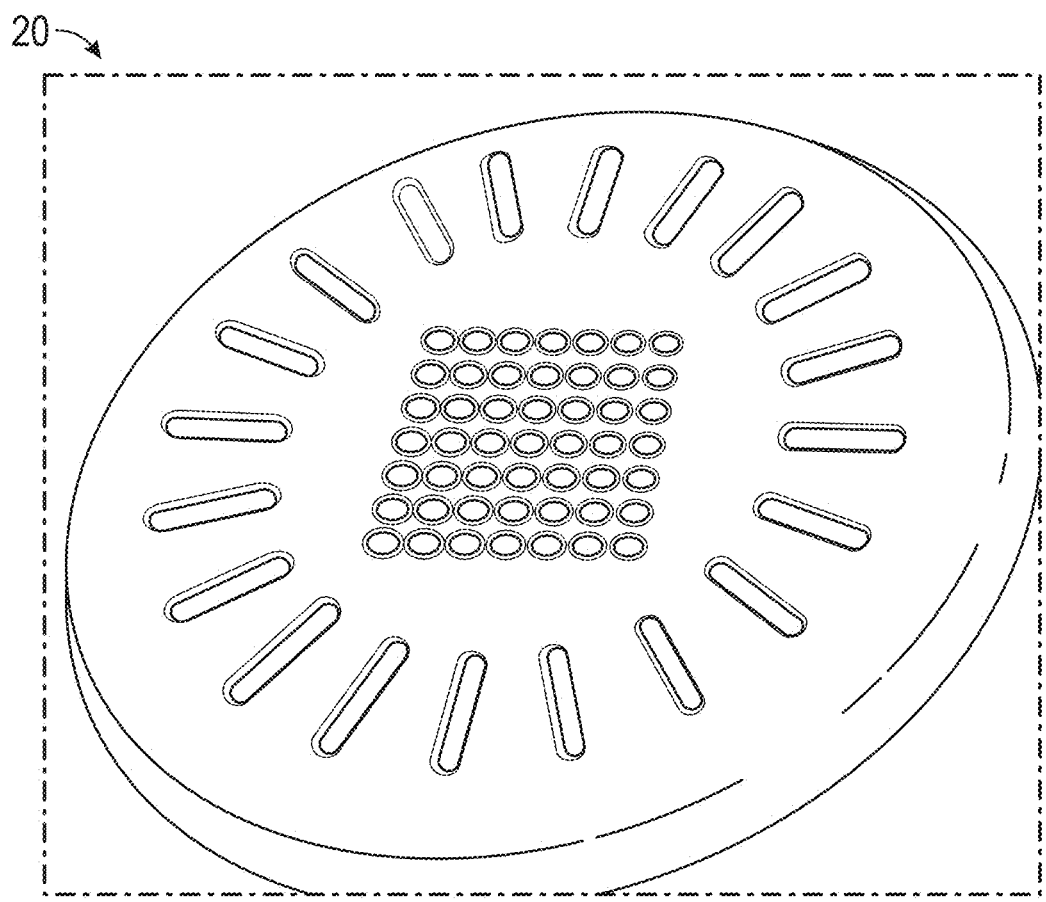
Figure 6E:
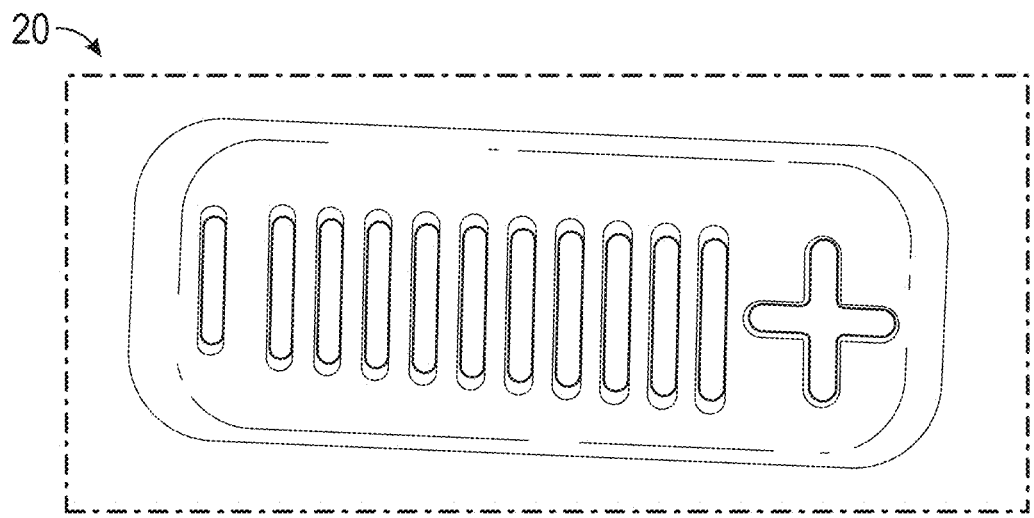

FIG. 6A shows another embodiment of the decorative outer cover 20 in which the blind recesses 24 may be at least partially filled with a transparent or translucent support material 26 (e.g. translucent thermoplastic polymer composition), which may be applied as a powder (e.g. PVC drysol), which is subsequently melted or as a liquid (e.g. PVC plastisol). FIGS. 6B-6E show close-up views for each of the features formed in the decorative outer cover 20 with the recesses 24 at least partially filed with the transparent or translucent material 26.

Figure 7A:
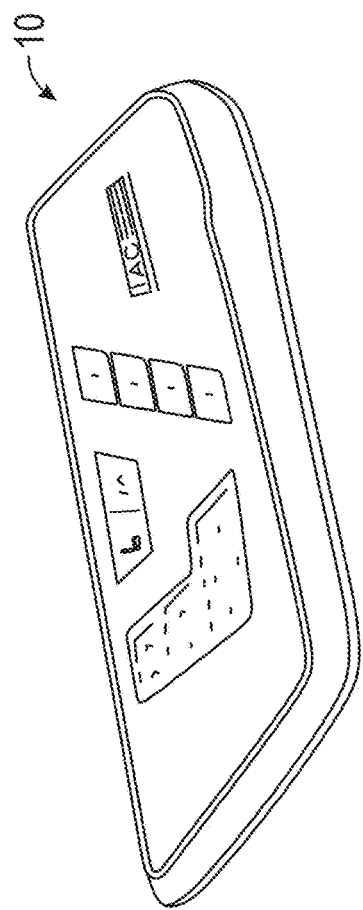
FIG. 7A shows an alternative embodiment of the interior trim article.
Figure 7B:
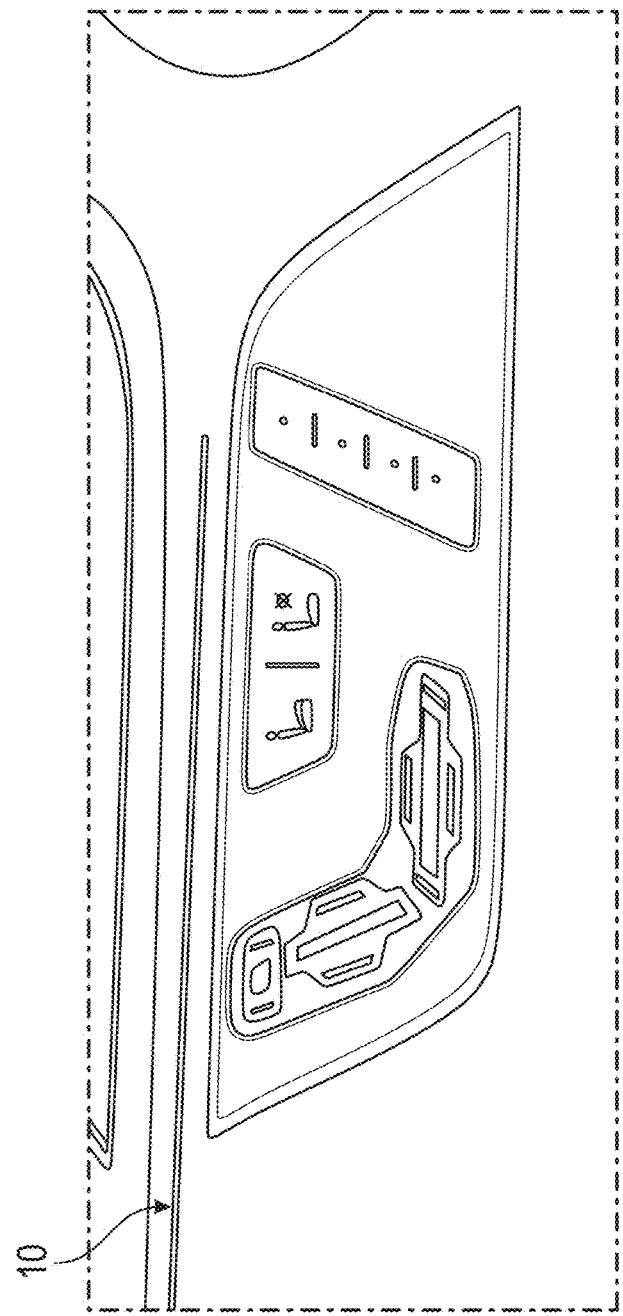
FIG. 7B shows an alternative embodiment of the interior trim article as part of an interior door panel.
Figure 7C:
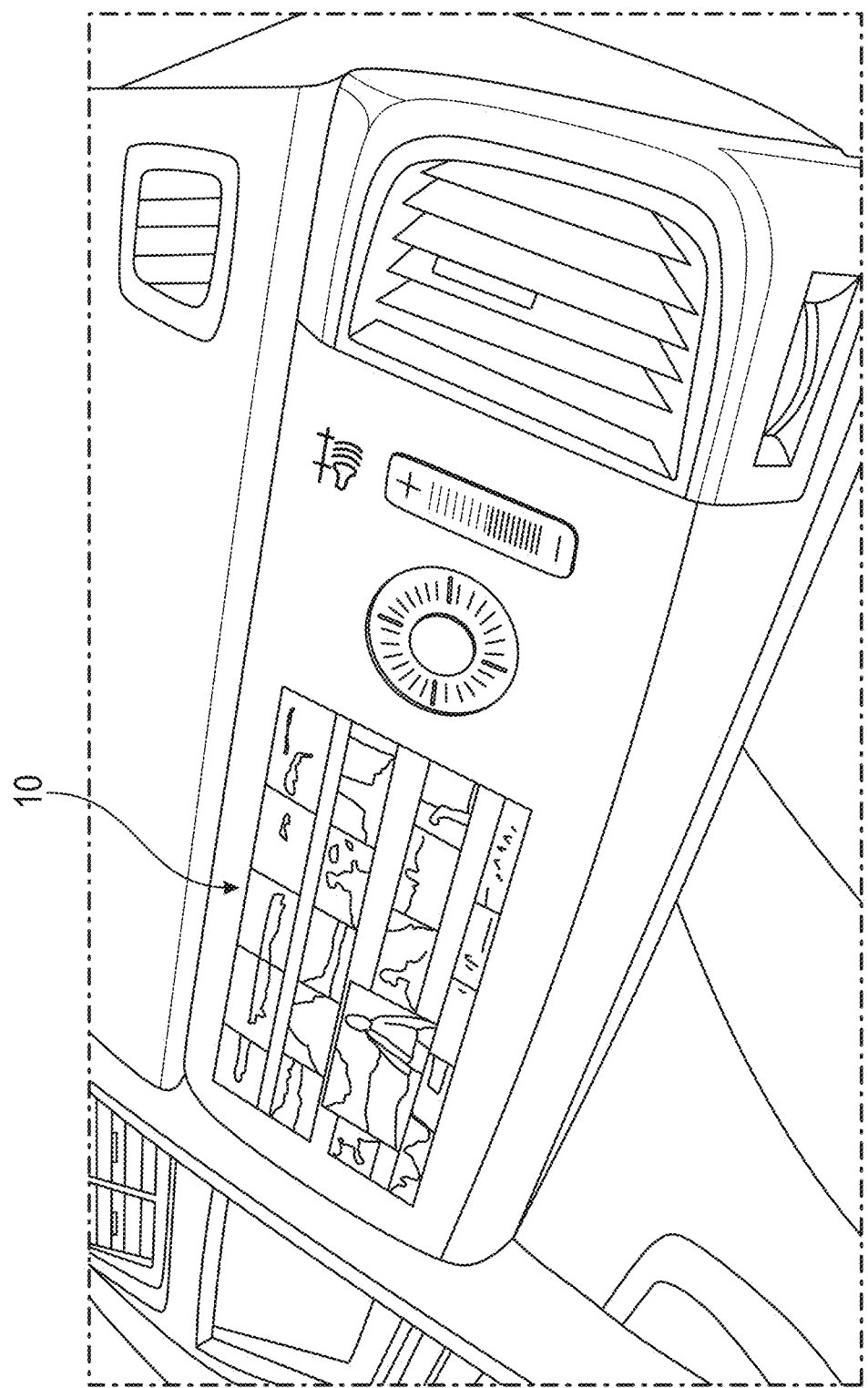
FIG. 7C shows an alternative embodiment of the interior trim article as part of an interior instrument panel.
Figure 8:
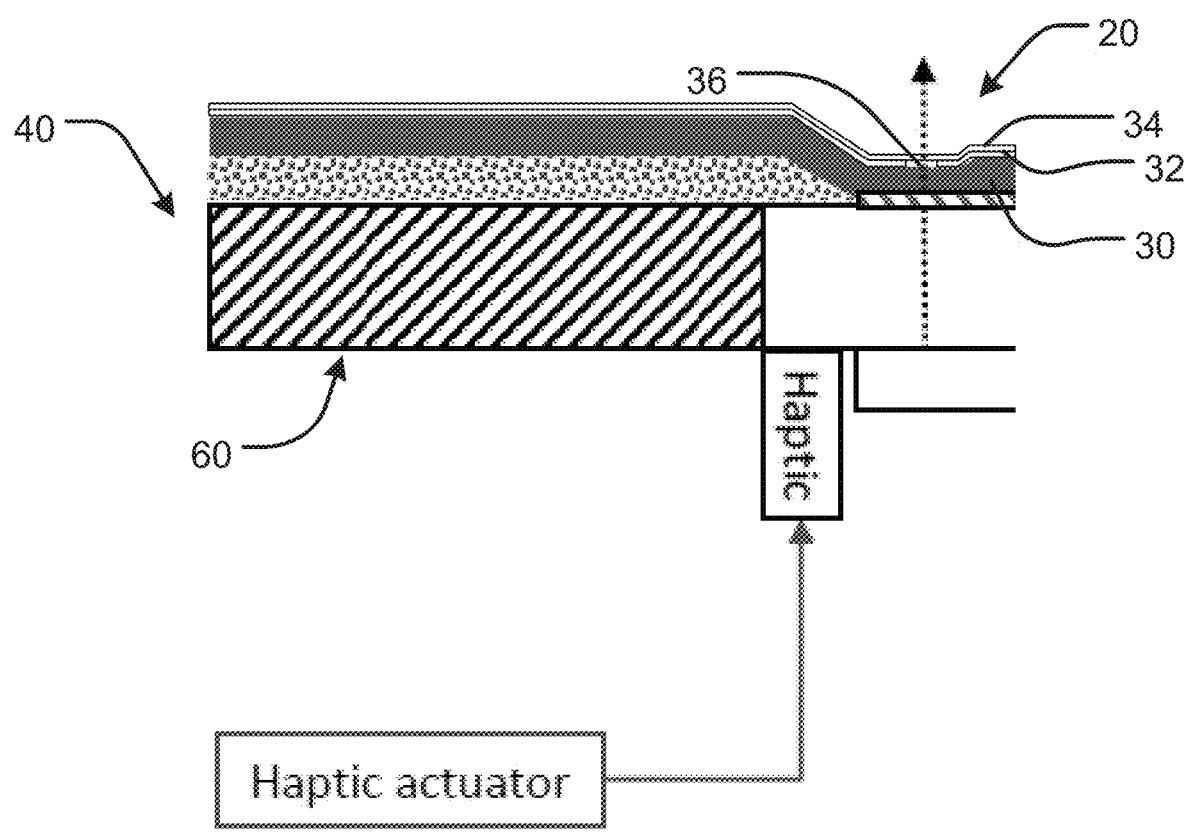
FIG. 8 is cross-sectional view of another interior trim article according to another embodiment of the disclosure taken along line 3-3 of FIG. 1.

FIG. 7A shows an alternative embodiment of the interior trim article, while FIG. 7B shows an alternative embodiment of the interior trim article as part of an interior door panel and FIG. 7C shows an alternative embodiment of the interior trim article as part of an interior instrument panel. While not shown, the interior trim article may be part of a center floor console, IP instrument panel, IP center stack, and door trim panel. In another embodiment of interior trim article 10, illustrated in FIG. 8, the decorative outer cover 20 comprises a translucent base layer 30, an opaque intermediate layer 32 and a protective transparent or translucent top layer 34. As shown, the opaque intermediate layer 32 has a laser etched region 36 through which light from light source 82 is emitted, through the translucent base layer 30 and the protective transparent or translucent top layer 34.

Other methods for preparing the interior trim article herein are contemplated to include the following which may preferably be achieved in one-step in a slush skin tool:

A. The local "translucent" areas may be achieved directly in the cavity of the slush skin tool. The areas to allow the backlight to pass thru are preferably compressed to a reduced thickness RT in a range of 0.1 mm to 0.3 mm while adjacent regions 24 of full thickness of the decorative outer cover 20, which are opaque to light transmission due to their increased thickness, mask the visible light 86 from the backlighting light source 82.

B. The stamping or compressing of local areas to allow light transmission may also be achieved with secondary injection pins in the tool cavity within the single cycle period, the retracted pins slide at a designated moment to reduce the material thickness at the desired location.

Opaque and translucent slush material processes (2-step): 1) cast a relatively thin opaque outer layer with the designated backlit areas pressed and locally reduce (see B above) and a second translucent material is cycled allowing for a relatively homogenous uniform thickness.

Other surface technologies and process are contemplated to include:
Injection Molded Skin: PVC, TPE or TPW "opaque" together with a secondary stamp operation to reduce thickness in local areas (two-step) or the thinned areas directly in the mold cavity (one-step).

2K Injection Mold—$1^{st}$ shot is opaque with relatively thin local areas reduced in the tool cavity (soft skin PVC, TPE or TPO, $2^{nd}$ shot translucent polymer (PP, ABS, PC-ABS, PC).

Back Injection Mold—(soft cover) Translucent Foil PVC, TPE or TPE with Translucent PP, ABS, PC-ABS or PC.

Laminated cover stock—(Translucent foil—PVC, TPO or TPE) on translucent substrate (PP, ABS, PC-ABS)

Integral sensor on B-side coverstock foil or cast slush skin prior to forming or other steps. Material may be processed with secondary screen printed "decale" or a direct screen print or digitally ink-jet printed sensor circuit on the B-side of the material.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

LISTING OF REFERENCE CHARACTERS 10 interior trim article
12 circle
20 decorative outer cover/skin
22 reduced thickness regions
24 blind recess
26. transparent/translucent support material
28 tactile switch indicators
30 base translucent layer
32 opaque layer
34 protective coat layer
36 laser etched region
40 backing/cushion
60 substrate/carrier
62 window (aperture/through opening)
64 light transmissive member/graphic
80 electronic apparatus
82 backlighting light source
84 touch-sensor foil
86 visible light
88 haptic actuator
92 connector
100 rear closure/housing
200 mold
210 stamping die
220 protrusions

What is claimed is:

1. An interior trim article for a motor vehicle, comprising:
a decorative outer skin;
an electronic apparatus comprising,
    a touch-sensor or proximity sensor; and
    a backlight lighting source disposed behind said touch sensor or proximity sensor to emit light through the touch-sensor and through the decorative outer skin;
a substrate having a transparent or translucent region; and
a rear closure, which covers the electronic apparatus and is removably fastenable to the substrate.

2. The interior trim article of claim 1 wherein said decorative outer skin includes one or a plurality of recesses.

3. The interior trim article of claim 2 wherein the recesses are blind recesses.

4. The interior trim article of claim 3 wherein the blind recesses are at least partially filled with a transparent or translucent support material.

5. The interior trim article of claim 1 wherein the transparent or translucent region of the substrate includes a window, which is occupied by a light transmissive member.

6. The interior trim article of claim 5 wherein the window or the light transmissive member includes one or more graphics.

7. The interior trim article of claim 1 wherein the decorative outer skin includes one or more tactile switch indicators on its surface to operate functions of the electronic apparatus and/or the motor vehicle.

8. The interior trim article of claim 1 wherein the electronic apparatus includes a haptic actuator, which provides tactile feedback to a user of the electronic apparatus in response to activation of the touch-sensor or proximity sensor.

9. The interior trim article of claim 1 wherein the touch-sensor or proximity sensor comprises a touch-sensor foil.

10. The interior trim article of claim 1 wherein regions of the decorative outer skin are configured as a mask to block light from being emitted from a front side of the decorative outer skin.

11. The interior trim article of claim 10 having a defined boundary between light transmissive and opaque regions of the decorative outer skin.

12. The interior trim article of claim 1 further comprising a soft touch layer wherein the substrate supports the decorative outer skin and the soft touch layer as well as the interior trim article and is configured for attachment to the motor vehicle.

13. A motor vehicle including the interior trim article of claim 1 wherein the interior trim article is part of a center floor console, IP instrument panel, IP center stack, or door trim panel.

* * * * *